United States Patent
Gössi et al.

(10) Patent No.: US 10,179,852 B2
(45) Date of Patent: Jan. 15, 2019

(54) THERMOPLASTIC MIXTURE WITH HIGH FLEXIBILITY AND HIGH MELTING POINT

(71) Applicant: SIKA TECHNOLOGY AG, Baar (CH)

(72) Inventors: Matthias Gössi, Uster (CH); Peter Zweifel, Linthal (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/426,032

(22) PCT Filed: Sep. 6, 2013

(86) PCT No.: PCT/EP2013/068423
§ 371 (c)(1),
(2) Date: Mar. 4, 2015

(87) PCT Pub. No.: WO2014/040914
PCT Pub. Date: Mar. 20, 2014

(65) Prior Publication Data
US 2015/0232651 A1 Aug. 20, 2015

(30) Foreign Application Priority Data

Sep. 11, 2012 (EP) .................................... 12183894

(51) Int. Cl.
*A61K 6/083* (2006.01)
*A61K 6/00* (2006.01)
*C08L 23/14* (2006.01)
*C08L 23/08* (2006.01)

(52) U.S. Cl.
CPC .......... *C08L 23/14* (2013.01); *C08L 23/0815* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,180,786 A * | 1/1993 | Era | ................. | C08F 279/02 525/204 |
| 5,639,829 A * | 6/1997 | Yamaguchi | ............. | C08L 23/12 524/451 |
| 5,750,311 A * | 5/1998 | Taniguchi | ................. | G03F 3/10 430/253 |
| 5,837,764 A * | 11/1998 | Akagawa | ................. | C08L 53/00 524/451 |
| 6,306,973 B1 * | 10/2001 | Takaoka | ................. | C08F 297/08 525/240 |
| 6,410,649 B1 * | 6/2002 | Oda | ................. | C08L 23/02 525/191 |
| 6,441,081 B1 * | 8/2002 | Sadatoshi | ........... | C08F 297/083 524/451 |
| 6,803,415 B1 * | 10/2004 | Mikielski | ............. | C08L 23/0815 525/191 |
| 8,207,267 B2 * | 6/2012 | Von Tschammer | ..... | C08L 23/10 280/728.3 |
| 2004/0106738 A1 * | 6/2004 | Machida | ................. | C08L 51/06 525/240 |
| 2004/0126518 A1 * | 7/2004 | Mendes | ................. | B32B 27/32 428/34.8 |
| 2005/0054781 A1 * | 3/2005 | Dharmarajan | .......... | C08L 53/00 525/240 |
| 2007/0167575 A1 * | 7/2007 | Weaver | ................. | C08L 23/16 525/240 |
| 2008/0150261 A1 * | 6/2008 | Von Tschammer | ..... | C08L 23/10 280/728.3 |
| 2010/0273959 A1 * | 10/2010 | Miyake | ................. | C08L 23/02 525/92 R |
| 2010/0280194 A1 * | 11/2010 | Miyake | ............... | B29C 45/0001 525/92 L |
| 2011/0272860 A1 * | 11/2011 | Walia | ................. | C08L 23/10 264/328.17 |
| 2015/0232651 A1 * | 8/2015 | Gossi | ..................... | C08L 23/14 523/122 |

FOREIGN PATENT DOCUMENTS

| | | | |
|---|---|---|---|
| CN | 1263899 A | 8/2000 | |
| CN | 101111557 A | 1/2008 | |
| EP | 0605180 A1 * | 7/1994 | .............. C08L 23/12 |

OTHER PUBLICATIONS

English Translation of International Preliminary Report on Patentability dated Mar. 17, 2015 corresponding to International Patent Application No. PCT/EP2013/068423, 8 pages.
English Translation of International Search Report dated Oct. 29, 2013 corresponding to International Patent Application No. PCT/EP2013/068423, 2 pages.
Office Action, and English Translation of Office Action dated Nov. 17, 2016 corresponding to Chinese Patent Application No. 201380048459.2, 10 pages.
Office Action, and English Translation of Office Action dated Jun. 9, 2017 corresponding to Chinese Patent Application No. 201380048459.2, 13 pages.
Office Action, and English Translation of Office Action dated Dec. 22, 2017 corresponding to Chinese Patent Application No. 201380048459.2, 16 pages.

* cited by examiner

Primary Examiner — Peter A Salamon
(74) Attorney, Agent, or Firm — Dentons US LLP

(57) ABSTRACT

A thermoplastic mixture is described that includes at least one impact-resistant polypropylene copolymer and at least one ethylene-1-octene copolymer. The weight ratio of impact-resistant polypropylene copolymer to ethylene-1-octene copolymer can be in the range of 35:65 to 65:35. The thermoplastic mixture has a high melting point and excellent flexibility. The mixture is suitable in particular for roof membranes and waterproofing membranes.

12 Claims, 2 Drawing Sheets

THERMOPLASTIC MIXTURE WITH HIGH FLEXIBILITY AND HIGH MELTING POINT

CROSS-REFERENCE TO PRIOR APPLICATIONS

Figure 1:
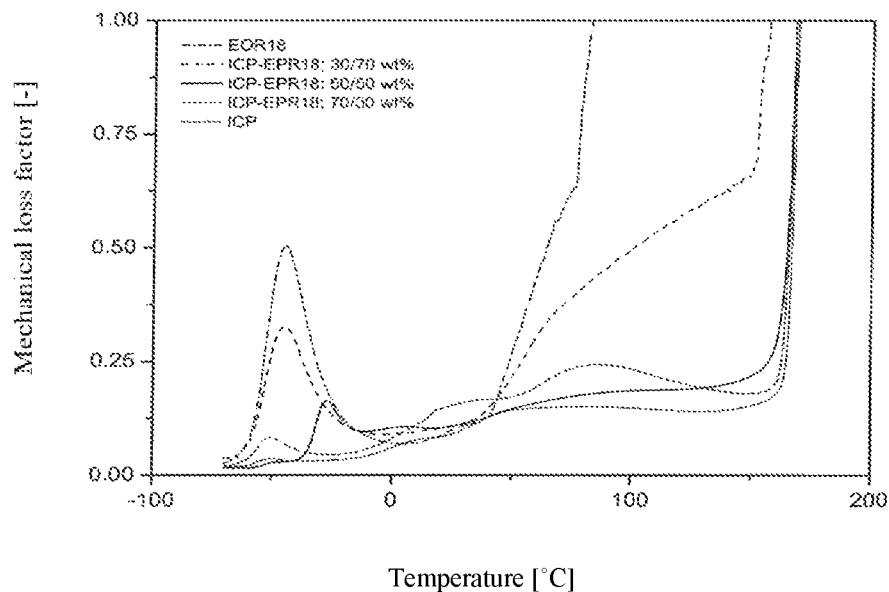

This application is a National Stage of PCT/EP2013/068423, filed Sep. 6, 2013, and designating the United States (published on Mar. 20, 2014, as WO 2014/040914A1), which claims priority under 35 U.S.C. § 119 to European Patent Application No. 12183894.0, filed Sep. 11, 2012, each hereby expressly incorporated by reference in its entirety and each assigned to the assignee hereof.

TECHNICAL FIELD

The invention relates to a thermoplastic mixture and its use for roofing membrane or waterproofing membrane.

PRIOR ART

The service temperatures of roof and motor vehicle applications such as roof or waterproofing membrane, for example, require materials with a melting point of at least 140° C. Polypropylene (PP) with a melting point of approximately 160° C. is therefore a standard first-choice plastic. Polyethylene (PE) with a melting point of at most 125° C. is not suitable for this purpose. However, isotactic polypropylene (iPP) is a stiff polymer, and due to its relatively high glass transition temperature (Tg approximately 10° C.), it has a poor notch impact strength, particularly at low temperatures. Therefore, iPP needs to be made more flexible and tougher.

In order to make iPP tougher, a second domain, which may be organic or inorganic, can be incorporated in the polymer. The incorporation of ethylene monomers in the propylene base structure has been found to be the most advantageous. Such polymers are well known commercial products, and they are referred to as statistical polypropylene copolymer or polypropylene random copolymer (RACO; "random copolymer") or impact-resistant polypropylene copolymer (ICP; "impact copolymer"). However, these polypropylene copolymers still have a relatively high stiffness.

Also commercially available are complex impact strength-modified mixtures made of polypropylene, polyethylene and copolymers thereof, which are referred to as "reactor blends." The polymers of these mixtures are produced simultaneously in a multizone reactor. The polymer mixtures obtained have a low modulus and thus a high flexibility and a higher melting point, approximately 140° C., than PE. However, their melting point is thus approximately 20° C. lower than that of mixtures based on iPP. Such polymer mixtures are commercially available under the name Hifax® from LyondellBasell.

PP homopolymers (iPP) and PP copolymers (RACO and ICP) have good miscibility with commercial ethylene-propylene copolymers such as Vistamaxx® or Versify®, and they can be made flexible by the addition of such ethylene-propylene copolymers. However, homopolymers or copolymers made flexible in this manner are frequently brittle at low temperatures.

In order to make iPP, RACO and ICP flexible, the use of ethylene-alpha-olefin copolymers, also referred to as polyolefin elastomers (POE), has also been investigated. Nitta et al., Polymer, 39, 53-58 (1998), investigated mixtures of iPP and ethylene-1-butene copolymers. Yamagushi et al., J. Polym. Sci., 35, 953-961 (1997), produced mixtures of iPP and ethylene-1-hexene copolymers. In another study, Yamagushi et al., J. Appl. Polym. Sci., 62, 87-97 (1996), investigated the compatibility of mixtures of iPP and ethylene-propylene rubber.

U.S. Pat. No. 6,803,415 B1 describes mixtures of 10 to 90 wt % of a random copolymer made of propylene and of a comonomer selected from ethylene and $C_4$-$C_8$ alpha-olefins with a melting point between 100° C. and 140° C., and 10 to 90 wt % of a random copolymer made of ethylene and of a comonomer selected from $C_3$-$C_{10}$ alpha-olefins, which have a certain Mw/Mn ratio. Such mixtures are proposed for producing extruded films and flexible cover films as well as for cables.

EP 0 605 180 A1 discloses polypropylene compositions made of 55 to 95 parts by weight of polypropylene and 5 to 45 parts by weight of an ethylene/1-butylene or ethylene/1-octene random copolymer. The polypropylene can be a random or block copolymer, wherein, however, the proportion of monomers other than propylene in the content should not be more than 10 mol %. The mixtures are used in films, particularly in the motor vehicle field, where they can be used in the interior furnishings or as decorative exterior elements.

Finally, US 2008/150261 describes partially crosslinked thermoplastic elastomer compositions which contain propylene/ethylene or propylene/α-olefin copolymers having an impact strength of at least 30 $kJ/m^2$, ethylene/α-olefin copolymers and thermoplastic elastomers as well as additional crosslinking agents. Such compositions can be processed at high production rates to form shaped parts, since the time required from the injection of the material to the sufficient hardening thereof is very short.

DESCRIPTION OF THE INVENTION

The problem of the present invention consisted in providing a material with high service temperature or high melting point and high flexibility, which is suitable for roof or waterproofing membrane, for example, for roof or motor vehicle applications. Surprisingly, a thermoplastic mixture with high melting point and high flexibility is obtained, which, in addition, has excellent mechanical properties and a very advantageous glass transition temperature, if one mixes a commercial impact-resistant PP copolymer (ICP) with an ethylene-1-octene copolymer in a certain ratio.

The invention therefore relates to a thermoplastic mixture which comprises at least one impact-resistant polypropylene copolymer and at least one ethylene-1-octene copolymer, wherein the weight ratio of impact-resistant polypropylene copolymer to ethylene-1-octene copolymer is in the range from 3565 to 6535.

In addition to a relatively high melting point, the mixture according to the invention has excellent properties with regard to thermal stability, flexibility and tensile strength, and it is therefore excellently suited for use in roofing membrane and waterproofing membrane.

The mixture according to the invention is a mixture of thermoplastic materials, in particular of the impact-resistant polypropylene copolymer and of the ethylene-1-octene copolymer. The mixture can contain one or more types of impact-resistant polypropylene copolymers, wherein as a rule only one type is used. The mixture can also contain one or more types of ethylene-1-octene copolymers, wherein as a rule only one type is used. Thermoplastic mixtures are commonly also referred to as thermoplastic blends.

Impact-resistant polypropylene copolymer is a common commercial product. Polypropylene is offered commercially essentially in three product groups, as PP homopolymer (hPP), as statistical polypropylene copolymer (RACO) and as impact-resistant polypropylene copolymer (ICP). The copolymers are copolymers of propylene with another olefin, as a rule ethylene. Impact-resistant polypropylene copolymer is based as a rule on isotactic polypropylene. Impact-resistant polypropylene copolymer is essentially a block copolymer of propylene and of an olefin such as ethylene, butylene, hexene and/or octene, for example, preferably ethylene. Accordingly, random copolymers made of propylene and an additional olefin should not be considered impact-resistant polypropylene copolymers in the sense of this invention. Numerous variants ranging from two-block to multi-block copolymers are known. Furthermore, variants with different numbers of blocks and/or different molecular weights are known. In addition to ICP, PP-B (polypropylene block copolymer) is also used as an abbreviated designation.

The incorporation of olefin monomers in a PP chain itself already results in an increase in the crystallization temperature. An additional nucleation can be achieved, for example, by the addition of nucleating agents. Impact-resistant polypropylene copolymer (ICP) is available as an impact-resistant polypropylene that is not additionally nucleated or as an impact-resistant polypropylene copolymer that is additionally nucleated (nICP). The use of nICP is preferable, since it has a lower modulus. As a result, the mixing quality is improved, which also yields a further improved tensile strength. The modulus can also be customized, for example, by the use of mixtures made of ICP and nICP.

Ethylene-1-octene copolymer is also commercially available in different variants, for example, relating to the 1-octene content and the molecular weight. Such copolymers can be produced by metallocene catalysis, for example. They are preferably copolymers with statistical distribution of the monomer units, which are also referred to as EOR (ethylene-1-octene random copolymer). The 1-octene content in the ethylene-1-octene copolymer can vary in broad ranges, but it is appropriately in the range from 1 to 25 mol %, preferably 2 to 20 mol %, and particularly preferably 5 to 20 mol % or 7 to 18 mol %, wherein a range from 16 to 20 mol % is particularly suitable. The proportion of 1-octene in the copolymer can be determined directly by $^1$H-NMR spectroscopy. The person skilled in the art is familiar with this method. The content can also be determined by a density measurement.

As mentioned, the copolymers are commercially available, but they can also be produced directly by the person skilled in the art himself/herself. Commercial products for ICP and nICP are available from ExxonMobil, for example. Dow markets, for example, ethylene-1-octene copolymers with different 1-octene contents as Engage® 8450, Engage® 8200 and Engage® 8842. ExxonMobil markets ethylene-1-octene copolymers under the name "Exact Plastomers®." Information on the production and on the properties of impact-resistant polypropylene copolymers can be obtained from US 2002086947 A1, for example, and of ethylene-1-octene copolymers from Weaver, L. B. et al., "A New Class of Higher Melting Polyolefin Elastomers for Automotive Applications," Proceedings of the SPE Automotive TPO Global Conference, 2006, for example.

The weight ratio of impact-resistant polypropylene copolymer to ethylene-1-octene copolymer is in the range from 35/65 to 65/35, preferably in the range from 4060 to 6040. The best properties are achieved with a weight ratio of impact-resistant polypropylene copolymer to ethylene-1-octene copolymer of approximately 50/50, that is, for example, in the range from 45/55 to 55/45.

In a particularly preferable embodiment, the weight ratio of impact-resistant polypropylene copolymer to ethylene-1-octene copolymer is in the range from 45/55 to 55/45, wherein the ethylene-1-octene copolymer has a 1-octene content of 16 to 20 mol %.

Using the mixing ratio adjusted according to the invention, a true mixture, i.e., a single phase, with a peak glass transition temperature (Tg) of approximately −25° C. can be achieved, which is unique for this composition. A corresponding mixed phase can also be found in "reactor blends," but to date not in polymer blends produced in the melt. A common phase is not obtained in the case of mixtures having the weight ratio of 70/30 or 30/70 of impact-resistant polypropylene copolymer to ethylene-1-octene copolymer. A single phase is also not obtained if hPP is used instead of ICP or nICP.

The melt flow index (MFI) of the ethylene-1-octene copolymer can vary in broad ranges. A suitable range for the MFI of the ethylene-1-octene copolymer used is, for example, 0.2 to 30 g/10 min, preferably 0.5 to 15 g/10 min. The MFI can be determined at 190° C., 2.16 kg in accordance with the standard ASTM D1238. The MFI of the impact-resistant PP copolymer can also vary within broad ranges. A suitable range for the MFI of the impact-resistant PP copolymer used is 1 to 16 g/10 min, for example. The MFI can be determined at 230° C., 2.16 kg according to the standard ISO 1133.

The thermoplastic mixture can consist of only impact-resistant polypropylene copolymer and ethylene-1-octene copolymer. However, one or more additives can also be added to the thermoplastic mixture, wherein the quantity thereof can be within the usual range. The proportion of impact-resistant polypropylene copolymer and ethylene-1-octene copolymer together in the thermoplastic mixture can vary, but in general it is at least 40 wt %, preferably at least 50 wt %, and particularly preferably at least 60 wt % of the thermoplastic mixture.

All the additives or admixtures that are suitable for the thermoplastic mixture and commonly used in PP homopolymers and PP copolymers, in particular for ICP, can be used. The selection of the optionally used additives depends on the intended purpose of use. Examples of additives are stabilizers such as antioxidants, for example, sterically hindered phenols, hydrazones or bishydrazones, UV stabilizers, for example, alkoxyhydroxybenzophenones and HALS stabilizers, heat stabilizers, light stabilizers, color acceptors such as pigments or dyes, crystal nucleating agents such as mono-, di- or polycarboxylic acids and their salts, antistatic agents such as compounds with hydroxyl, amino or amide groups, plasticizers, lubricants such as fatty acid salts, fatty acid esters or fatty acid amides, hydrophobizing agents, compatibilizers, biocides and flame retardants.

As additional additives, fillers and other polymers can be considered. Commonly used fillers are, for example, chalk, fly ash, wood meal, glass fibers, glass beads and talc. Other polymers can be used, for example, as compatibilizers. Examples of compatibilizers are ethylene-propylene rubbers (EPR) or ethylene-propylene-diene rubbers (EPDM), which can influence the mechanical properties such as the impact resistance.

In individual cases, the thermoplastic mixture can also contain crosslinked thermoplastic elastomers, for example, in the form of SBS (styrene-butadiene-styrene), SEBS (styrene-ethylene/butadiene-styrene), SEPS (styrene-ethylene/propylene-styrene) or SEP (styrene-ethylene/propylene).

However, it is preferable for the amount of such thermoplastic elastomers to be, to the extent possible, not more than 5 wt % relative to the total weight of the thermoplastic mixture, since, as a result of an excessively high proportion of such polymers, the welding of, for example, roofing membrane produced from the mixture can no longer be guaranteed. Therefore, it is preferable for the thermoplastic mixture to contain less than 1 wt % of crosslinked thermoplastic elastomers, and particularly preferably to be free of crosslinked thermoplastic elastomers.

Using crosslinking agents, it is also possible to crosslink the thermoplastic mixture, which would affect the weldability of products prepared from the mixture. Accordingly, the thermoplastic mixtures can indeed in principle also contain crosslinking agents, in particular free radical formers such as peroxides or photoinitiators, as additives; however, it is preferable for the proportion of such crosslinking agents to be as small as possible, i.e., less than 1 wt % relative to the total weight of the thermoplastic mixture. It is particularly preferable for the thermoplastic mixture to be free of crosslinking agents or for the thermoplastic mixture to be a crosslinking agent-free thermoplastic mixture.

All or some of the additives can naturally already be contained in the starting materials used, for example, in the ethylene-1-octene copolymer or preferably in the impact-resistant PP copolymer. Furthermore, the additives can also be added in the process of mixing the copolymer starting materials. They can also be added in a subsequent compounding step, for example, in a second extruder or simply by mixing into the powder of the thermoplastic mixture obtained. The preparation of the thermoplastic mixture occurs by conventional methods known to the person skilled in the art. The starting materials can be introduced, for example, in the form of powder, granulate or pellets into a mixing device and mixed at elevated temperature, for example, in the range from 180 to 300° C. As mixing device, it is appropriate to use an extruder, for example, such as a single-screw or preferably a twin-screw extruder in which the starting materials are plasticized and mixed at elevated temperature. The mixture can then be extruded through a nozzle and granulated with a cutting device. The mixture can thus be obtained as granulated product, for example, as granulate or powder or pellets.

The thermoplastic mixture according to the invention is particularly suitable for roof or motor vehicle applications, wherein roof applications are preferable. The thermoplastic mixture is preferably used for roofing membrane or waterproofing membrane or sealing membranes.

Roofing membrane and waterproofing membrane comprise or consist of plastic sheeting for the manufacture of which the thermoplastic mixture of the present invention is suitable.

The terms roofing membrane and waterproofing membrane in this document refer particularly to flexible flat plastics with a thickness from 0.1 to 5 mm, in particular 0.5 to 4 mm, which can be rolled up. Thus, in addition to films in the strict sense, which have thicknesses of less than 1 mm, it is possible also, and in particular preferable, to use waterproofing membrane as used typically for the sealing of roofs or terraces, which has a thickness of typically 1 to 3 mm, in special cases even a thickness of at most 5 mm. Such membranes are usually produced by spreading, casting, calandering or extrusion, and they are typically commercially available in rolls or produced on site. They can have a single layer or a multiple layer structure. It is clear to the person skilled in the art that such membranes in addition can contain other additives and processing agents such as fillers, UV and heat stabilizers, plasticizers, lubricants, biocides, flame retardants and antioxidants. Pertinent examples have been mentioned above. Additional additives, as described above for example, can also be part of the content.

EXAMPLES

Below some examples are indicated, which further illustrate the invention but are not intended to limit the scope of the invention in any way. Unless otherwise indicated, the proportions and percentages refer to the weight.

For the determination of the 1-octene content in the ethylene-1-octene copolymer, $^1$H-NMR spectroscopy was carried out with a Bruker Ultrashield 300 MHz. 30-35 mg of a sample of the copolymer were dissolved in 0.7 mL of 1,2-dichlorobenzene-d4 for 2 hours at 150° C. in the microwave oven and 256 scans were accumulated at 130° C. For the calculation of the 1-octene content, the following formula was used:

$$\frac{\frac{I_{CH_3}}{3}}{\frac{I_{CH_2}}{2} \cdot \left(1 - \frac{1}{3}x\right) + \frac{I_{CH_3}}{3}} = \frac{1}{3}x$$

where $I_{CH_3}$ corresponds to the integral of the peak at 0.9 ppm assigned to the methyl terminal group, and $I_{CH_2}$ corresponds to the integral of the peak at 1.3 ppm which is assigned to the H atoms of the CH2 groups of the base structure and of the 1-octene side chains, and x corresponds to the content of 1-octene in mol %. The measured peak positions correspond to the data in the literature.

The following compounds were used as starting materials. The MFI of the polypropylene-containing homopolymers and copolymers was measured at 230° C./2.16 kg. The MFI of the ethylene-1-octene copolymer was determined at 190° C./2.16 kg.

PP7043L1 IPC (impact-resistant PP copolymer) from ExxonMobil, MFI=8 g/10 min, Mw≈398,000 g/mol PP8013L1 nIPC (nucleated impact-resistant PP copolymer) from ExxonMobil, MFI=8 g/10 min, Mw≈344,000 g/mol PP1063L1 hPP from ExxonMobil, MFI=8 g/10 min, Mw≈477,000 g/mol Engage® 8842 EOR18, ethylene-1-octene copolymer from DOW, MFI=2 g/10 min, Mw≈176,000 g/mol, 1-octene content=17.9 mol %

Hifax® CA212 thermoplastic polyolefin (reactor blend of polyethylene and polypropylene), MFI=8 g/10 min The starting polymers were mixed in the mixing ratios indicated in the table below. For this purpose, the polymers were compounded in a co-rotating twin-screw extruder having a cavity volume of approximately 5 cm$^3$. The mixing was carried out at a shear rate of 100 rpm at 200° C. for 20 min. Subsequently, the polymer melt was released from the extruder and cooled in air. All the tests were carried out in a nitrogen atmosphere. The samples obtained were investigated with the following methods.

Thermal Analysis

The melting points and crystallization temperatures were determined using a differential scanning calorimeter (DSC) from Mettler Toledo, DSC 882$^e$. The melting points were determined from the first heating pass from −30° C. to 200°

C. at a heating rate of 10° C. min⁻¹ (sample weight approximately 10 mg). The crystallization temperatures were determined from the first cooling pass from 200° C. to −30° C. at a cooling rate of 10° C. min⁻¹.

Dynamic Mechanical Analysis

DMA measurements were conducted with a Mettler Toledo DMA/SDTA 861$^e$. The glass transition temperatures were determined from the phase angle tan δ which corresponds to the ratio of the loss modulus to the storage modulus. The samples were heated from −90° C. to 200° C. at a heating rate of 5° C. min⁻¹. The frequency was kept constant at 1 Hz, while the maximum force amplitude and the maximum displacement were limited to 10 N and 5 μm, respectively. The shear deformation was between 0.25 and 0.5%.

content that is in the range of from 2 mol % to 20 mol %, wherein the 1-octene content is determined by ¹H-NMR spectroscopy and calculated according to a formula below:

$$\frac{\frac{I_{CH_3}}{3}}{\frac{I_{CH_2}}{2} \cdot \left(1 - \frac{1}{3}x\right) + \frac{I_{CH_3}}{3}} = \frac{1}{3}x$$

wherein $I_{CH3}$ corresponds to an integral of the peak at 0.9 ppm assigned to a methyl terminal group, $I_{CH2}$ corresponds to an integral of the peak at 1.3 ppm, which is assigned to the H atoms of the CH₂ groups of the base structure and of the 1-octene side chains, and x corresponds to the content of 1-octene in mol %.

TABLE

| | Example | | | | | | | |
|---|---|---|---|---|---|---|---|---|
| | 1*<br>ICP | 2*<br>EOR18 | 3*<br>ICP/<br>EOR18 | 4<br>ICP/<br>EOR18 | 5*<br>ICP/<br>EOR18 | 6<br>nICP/<br>EOR18 | 7*<br>hPP/<br>EOR18 | 8*<br>Hifax<br>CA212 |
| Weight ratio | | | 70/30 | 50/50 | 30/70 | 50/50 | 50/50 | |
| DMA | | | | | | | | |
| Peak glass transition temperature [° C.] | (−50/10) | −45 | −50 | −25 | −45 | −27 | −50 | −22 |
| DSC | | | | | | | | |
| Peak melting point [° C.] | 166 | 38 | 166/40 | 166 | 165/39 | 165/44 | 165/35 | 145/40 |
| Peak crystallization temperature [° C.] | 115/94 | 22 | 120/75/20 | 120/75 | 120/75/20 | 124/76 | 124/21 | 100/75 |

*not according to the invention

Figure 2:
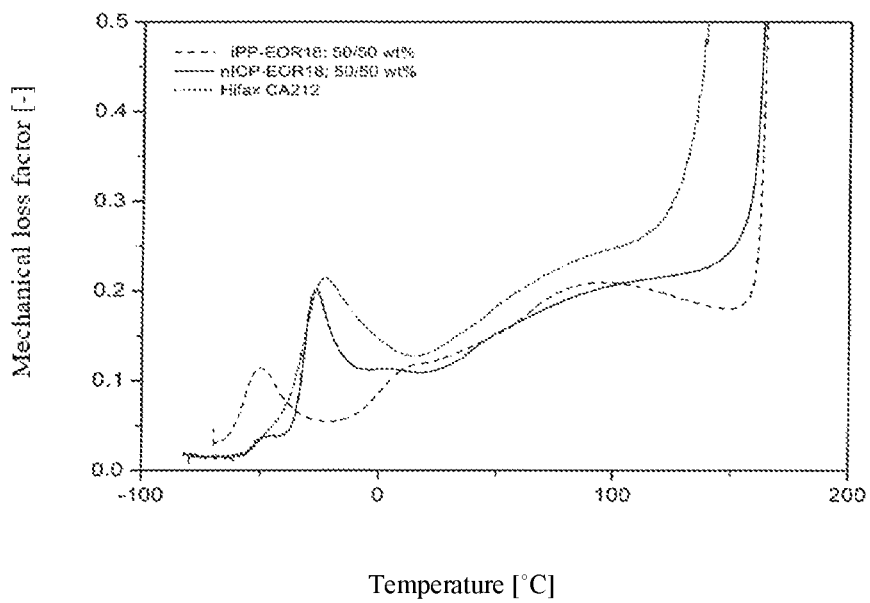
Figure 3:
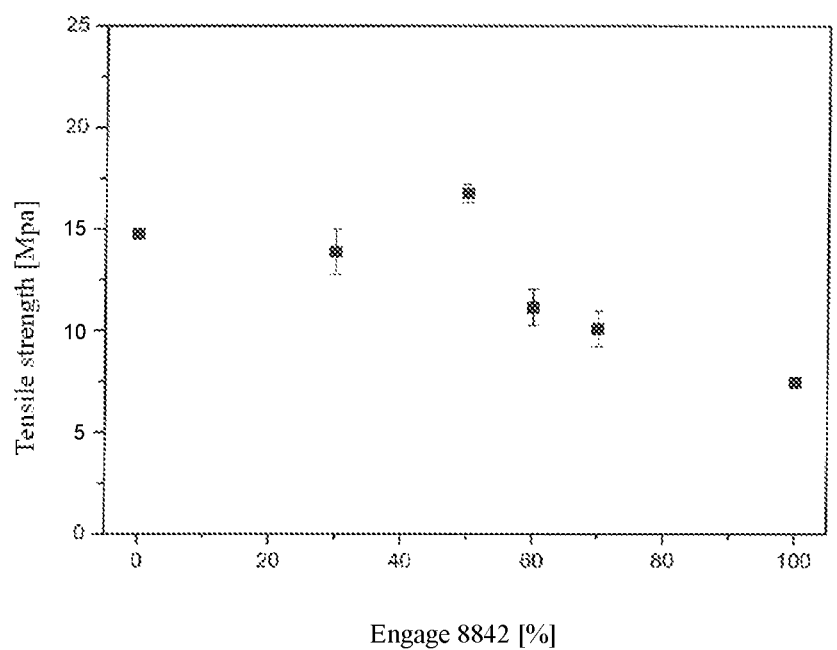

FIG. 1 shows the mechanical loss factor as a function of the temperature for different mixing ratios of ICP and EOR18. FIG. 2 shows the mechanical loss factor as a function of the temperature for hPP, Hifax® CA212, and a 50/50 mixture of nICP and EOR18. In FIG. 3, the tensile strength is shown as a function of the content of EOR18 in nICP/EOR18 mixtures.

The impact-resistant PP copolymer shows improved compatibility with EOR18 compared with hPP. Mixtures of ICP with EOR18 in the ratio 50/50 show no crystallization at approximately 20° C. (DSC) and a single relaxation peak at −25° C., which indicates miscibility of the two copolymers in one phase.

The invention claimed is:

1. A thermoplastic mixture comprising at least one impact-resistant polypropylene copolymer (ICP) and at least one ethylene-1-octene copolymer,
    wherein the at least one impact-resistant polypropylene copolymer is a block copolymer based on isotactic polypropylene having a melt flow index (MFI) of 8 g/10 min to 16 g/10 min determined at 190° C., 2.16 kg with a standard ASTM D1238, and
    wherein the mixture has a weight ratio of impact-resistant polypropylene copolymer to ethylene-1-octene copolymer in a range of from 35/65 to 65/35.

2. The thermoplastic mixture according to claim 1, wherein the ethylene-1-octene copolymer has a 1-octene 3. The thermoplastic mixture according to claim 1, wherein the impact-resistant polypropylene copolymer (ICP) is selected from the group consisting of an impact-resistant polypropylene copolymer that is not additionally nucleated, an impact-resistant polypropylene copolymer that is additionally nucleated (nICP), and mixtures thereof.

4. The thermoplastic mixture according to claim 1, wherein the weight ratio of impact-resistant polypropylene copolymer to ethylene-1-octene copolymer is in a range of from 40/60 to 60/40.

5. The thermoplastic mixture according to claim 1, wherein the ethylene-1-octene copolymer has a 1-octene content in the range of from 7 mol % to 18 mol %.

6. The thermoplastic mixture according to claim 1, wherein the combined weight of impact-resistant polypropylene copolymer and ethylene-1-octene copolymer in the thermoplastic mixture amounts to at least 50 wt % of the thermoplastic mixture.

7. The thermoplastic mixture according to claim 1, wherein the mixture comprises one or more additives selected from the group consisting of fillers, UV stabilizers, heat stabilizers, plasticizers, lubricants, biocides, flame retardants and antioxidants.

8. The thermoplastic mixture according to claim 1, wherein the mixture is in the form of a roofing membrane, a waterproofing membrane, at least one layer of a roofing membrane, or at least one layer of a waterproofing membrane.

9. A roofing membrane or a waterproofing membrane comprising the thermoplastic mixture according to claim 1.

10. The thermoplastic mixture according to claim 1, wherein the ethylene-1-octene copolymer has a melt flow index (MFI) in the range of from 0.2 to 15 g/10 min, wherein the MFI is determined at 190° C., 2.16 kg in accordance with a standard ASTM D1238.

11. The thermoplastic mixture according to claim 1, wherein the weight ratio of impact-resistant polypropylene copolymer to ethylene-1-octene copolymer is in the range of about 50/50 to 35/65.

12. A thermoplastic mixture comprising at least one impact-resistant polypropylene copolymer (ICP) and at least one ethylene-1-octene copolymer,
   wherein the at least one impact-resistant polypropylene copolymer is a block copolymer based on isotactic polypropylene, and is a nucleated impact-resistant polypropylene copolymer (nICP) or a mixture of nICP and ICP having a melt flow index (MFI) of 8 g/10 min to 16 g/10 min determined at 190° C., 2.16 kg with a standard ASTM D1238; and
   wherein the mixture has a weight ratio of impact-resistant polypropylene copolymer to ethylene-1-octene copolymer in a range of from 35/65 to 65/35.

* * * * *